United States Patent [19]
Membrino et al.

[11] 4,303,989
[45] Dec. 1, 1981

[54] DIGITAL DATA SORTER EXTERNAL TO A COMPUTER

[75] Inventors: Robert J. Membrino, Silver Spring, Md.; George D. Gilbreath, Jr., Alexandria, Va.

[73] Assignee: The Singer Company, Binghamton, N.Y.

[21] Appl. No.: 58,408

[22] Filed: Jul. 17, 1979

[51] Int. Cl.³ .............................................. G06F 7/00
[52] U.S. Cl. .................................................... 364/900
[58] Field of Search ... 364/200 MS File, 900 MS File

[56] References Cited
U.S. PATENT DOCUMENTS
3,685,024 8/1972 O'Connor ............................ 364/900
3,713,107 1/1973 Barsamian ........................... 364/200

Primary Examiner—Raulfe B. Zache
Attorney, Agent, or Firm—Ronald Reichman; Stephen C. Kaufman

[57] ABSTRACT

This invention is an electronic sorting system that saves computer software and computer time by sorting random data that is stored in selectable locations within a digital computer. The electronic sorting system removes the random data from the digital computer and sorts this data in ascending order by repeatedly comparing the data. The sorted data is then loaded into the computer in other selectable locations within the digital computer.

7 Claims, 2 Drawing Figures

DIGITAL DATA SORTER EXTERNAL TO A COMPUTER

FIELD OF THE INVENTION

This invention relates to electronic circuits and more particularly to devices for sorting data.

DESCRIPTION OF THE PRIOR ART

We perceive a variety of characteristics of the things around us, such as colors, shapes, sizes, etc. In order to better understand and control these characteristics man has devised systems to measure and catalog physical characteristics. For instance, a botanist may classify flowers according to color, shape and size.

As civilization has progressed the need to keep records pertaining to the characteristics of things or amounts of things has increased. After the information or data is classified, it is usually necessary to arrange the data in a predetermined sequence to facilitate processing. This arranging procedure is called sorting. Sorting is done by number and/or by letter. Sales invoices may be sorted by invoice number or by customer name in alphabetic sequence. Each invoice may contain several items of information. The invoices may be sorted by identifying a particular item of information in the invoice. This may be called the key. The information then may be sorted into the ascending or descending order of their keys.

Most sorting schemes involve moving the elements to be sorted from one place to another. The elements are generally moved several times before the final sorted order to achieved. Thus sorting is used to put items in order. The most obvious way to sort a group of invoices is first to set up for each different key or information that is wanted a pigeonhole, a space on a table, a space between two leaves in a leaf sorter or the equivalent. Then the keys on each successive document may be examined. The document may then be put in the corresponding pigeonhole and the process completed in a single pass. This works superbly if the number of possible keys is small and if each pigeonhole is big enough to hold all the invoices it might receive. The solution to handling larger ranges of keys is to perform the sort in several passes through the invoices or items, i.e., a person anxious to sort a deck of playing cards is likely to start by first sorting the deck into four parts by suit, then each pile containing a single suit is sorted by distributing individual cards into their proper slot by face value, then the cards are picked up in sequence.

In order to more efficiently process information, data processing systems have been developed. The data processing systems may be mechanical, electromechanical or electronic machines. These systems are used for transforming information given to the system in unorganized form into a suitably organized order that is determined by some preplanned procedure. Punch cards may be used in data processing systems. The conventional punch card is divided arbitrarily into 80 columns. Any or all of which may be punched in or two or sometimes three of thirteen different row positions. The punch cards may be produced by manual operation of a key punch machine having a typewriter-like keyboard. A key punch operator punches information onto the card according to some predetermined code, i.e. each item or part listed on the invoice may have a different code. One of the simplest yet most powerful devices for processing punch cards is the sorter. A sorter examines any single column in each card successively and deposits the card in one of thirteen pockets depending on whether the first hole encountered is in the 12th row, the 11th row, etc. or whether no hole is present at all. In that instant it rejects the card. Sorters have been developed that are capable of processing many cards per minute. The sorters are used to arrange the cards in other according to a key or field, i.e., a file or payroll card may be sorted into alphabetical order by last name with the name as the key. Sorters sense holes of a single column and act by disposing each card into one of the thirteen pockets corresponding to each of the card rows or to a blank column. Information occupying more than a column is arranged by iteratively sorting on a sequence of columnar positions.

Sorting may also be accomplished by utilizing magnetic tape. Magnetic tape may have 8 channels. Two channels are used for timing and checking the tape, the other six channels are used to represent an alphaneumeric character in a six bit code. Neumeric information may also be coded onto the magnetic tape. Magnetic tape read and write circuitry is connected through amplifiers to a computer by way of special storage registers. Digital tape sorting is performed analogously to punch card sorting. Since tape units are usually not efficient in start/stop operation and since the rate of arrival at each of the outputs corresponding to the sorter pockets is unpredictable and uneven, arrangements are usually made to accumulate enough separate information to be sent to a given output to make it worthwhile to start the tape unit and accumulate items on the tape. After one pass in which information has been dispersed onto the several outputs it would be wasteful to read back all the data merely to collect it onto one tape for the second pass. Therefore each of the original outputs is usually treated in its turn as an input with information being dispersed onto a different set of new output tapes in accordance with the next larger digit of the key. Thus the tapes which serve as the output pockets in the first pass are usually used sequentially as inputs in the second pass then serve as outputs again on the third pass, etc. Clearly a base 10 digital sort that requires 10 pockets requires 20 tapes if this procedure of alternating inputs and outputs is employed. Most tape processing systems do not, for reasons of economy, include twenty tape units. Consequently, when digital sorting is done using tapes it is usually done to the base 2 or 3. Where 4 or 6 tape units are required sorting may be directly performed within the memory of the computer. However, because the sort sometimes does not fit in the memory of the conventional computer system, only small parts of the sort may be internally sorted and sorting of the entire information is usually accomplished by employing techniques which involve the use of secondary storage devices like tapes or punch cards, etc.

The sorting done in the prior art was also accomplished inside. When this method was employed the computer required valuable processing time to accomplish the sort.

SUMMARY OF THE INVENTION

This invention overcomes the disadvantages of the prior art by providing a flexible hardware system that is capable of handling different size sorts. The system is actually an electronic circuit that is under the control of a computer so that the size of the sort may be changed by a computer program. By using the apparatus of this invention which is connected to a digital computer it is possible to reduce the amount of time that is required to sort data. The apparatus of this invention receives random data from selectable locations within a digital computer. This device sorts data by repeatedly removing the lowest values of the data in order to create a list of data in ascending order. The sorted data is then placed into selectable locations within the computer that originally supplied the data. The foregoing is accomplished without destroying the original data list. This sorting device may be used in the system described in W. K. Burchard, et al U.S. Pat. No. 3,514,521 entitled "Collision Avoidance Radar Trainer" which issued on May 26, 1970. Burchard's system is used to teach students how to use and operate radar and other similar type devices. In order to illuminate data points in the proper sequence on radar screens the foregoing system sorted data within a digital computer. The sorted data represented ordered radar hits on a radar sweep. These points of light will be displayed on a radar screen in a specific order. Since the sweep takes place on the radar screen from the center of the screen out towards the edge of the screen, the points of light have to be arranged in order of lowest magnitude of distance from the center of the screen so that the points of light can be turned on as the sweep goes around the screen. Whereas, the apparatus of this invention sorts the data that is stored in digital format within Burchard's computer in order to display the radar contact points in proper order to form a realistic picture. These radar hits or radar contact points are received by the sorter in a random order. The sorter arranges the radar contact points in ascending order to produce a list of points of light that will happen on a particular radar sweep. The sorter is capable of taking a random list of ranges and arranging them in ascending order external to a computer permitting the sort to be performed by external hardware. Thus, a large amount of computer time is saved since the computer no longer has to sort the data.

It is an object of this invention to provide a new and improved system for sorting information.

It is another object of this invention to provide a new and improved system for arranging information in alphaneumeric order in order to relieve the load on a digital computer.

It is a further object of this invention to provide a new and improved system for arranging data in ascending order of range of targets.

Further objects and advantages of this invention will become more apparent as the following description proceeds, which invention should be considered together with the accompanying drawings.

DESCRIPTION OF A PREFERRED EMBODIMENT

Figure 1:
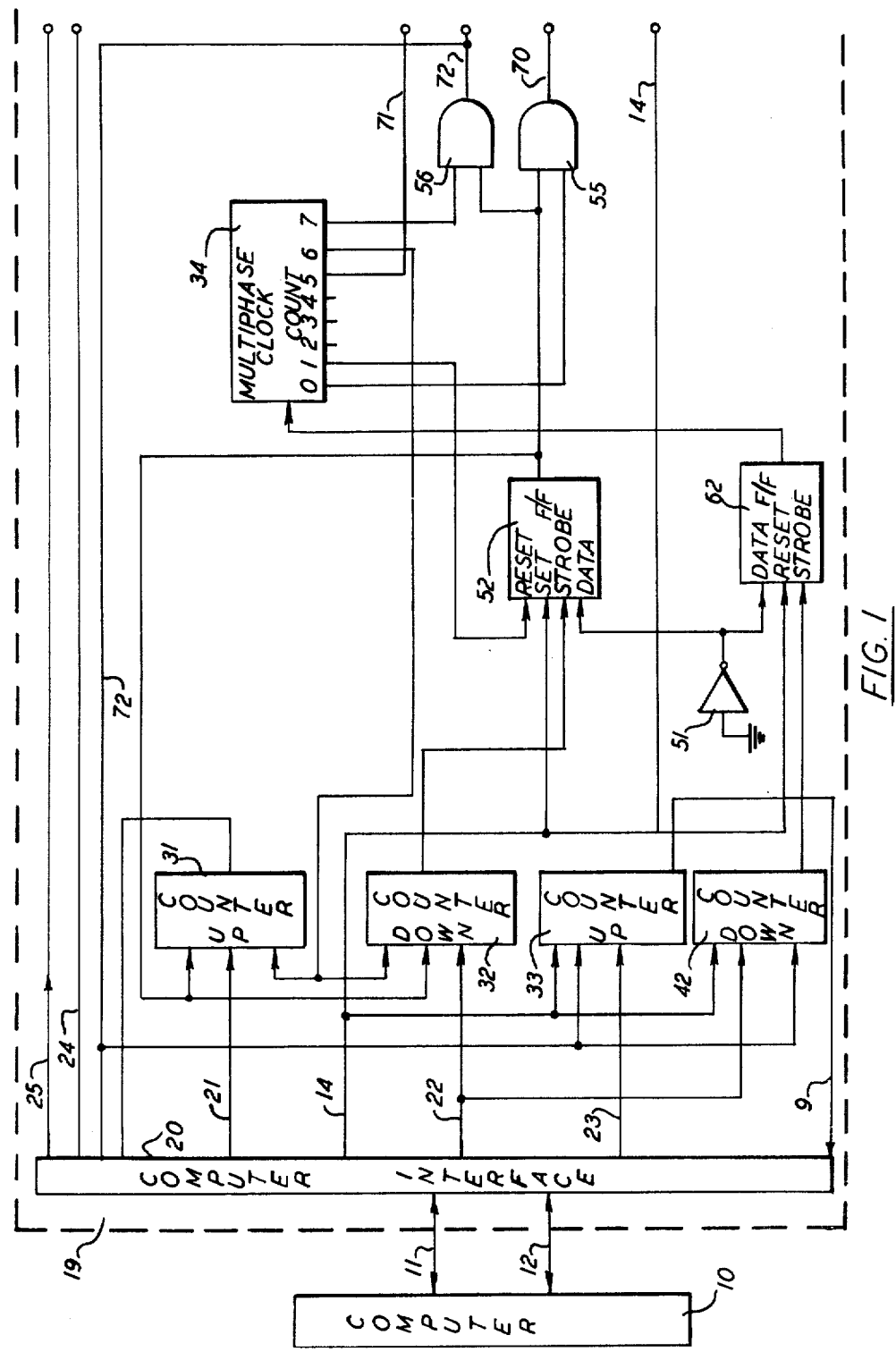
FIGS. 1 and 2 are logic diagrams of the electrical system which comprises this invention.
Figure 2:
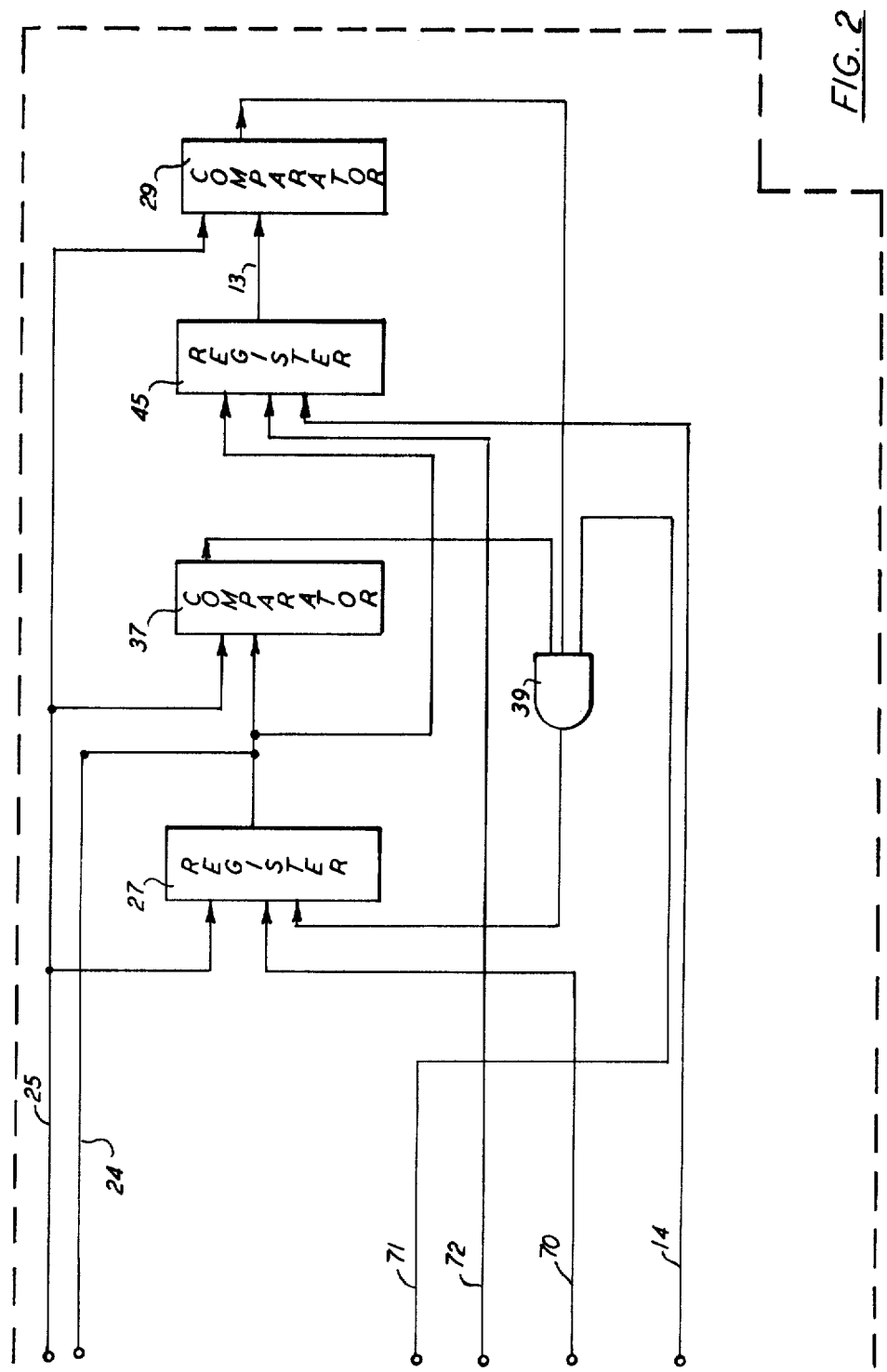

Referring to the drawings in detail and more particularly to FIG. 1, the reference character 10 represents a general purpose digital computer that generates ranges of simulated radar signals. Computer 10 is coupled to computer interface 20 via bidirectional busses 11 and 12. Bidirectional bus 11 is used to transmit address information and bidirectional bus 12 is used to transmit data information. Computer interface 20 will route the data on bus 12 to the appropriate lines in sorter 19 by decoding the address information that appears on bus 11. Interface 20 will transmit and receive data between sorter 19 and computer 20. When computer 10 wants to initiate a sort, a code is transmitted to interface 20 via bus 11. Interface 20 then generates a signal that is transmitted via line 14 to one of the inputs of flip flops 52 and 62 and to the input of register 45 (FIG. 2). The foregoing signal sets flip flop 52, resets flip flop 62 and clears to zero register 45. The total number of words going to be sorted by sorter 19 is transmitted to the inputs of down counters 32 and 42 via line 22. Counters 32 and 42 keep track of the word count, that is, they determine the number of words that have been processed by sorter 19. Counter 31 records the location of the word that sorter 19 is presently looking at in the unsorted list and counter 33 is used to keep track of the location where the next sorted word will be loaded into computer 10. Counter 42 is a down counter that receives from interface 20 via line 22 the number of words that are to be in the sorted list. Counter 32 stores the total number of words in the unsorted list. The location of the first word in the list of words that are to be sorted is transmitted via line 21 to the input of counter 31.

Counters 31, 32, 33 and 42 are set to the value seen on their data input by applying a logic 1 to their load input. Counters 32 and 42 will have their present value decreased by one if a positive pulse is applied to their decrement inputs. The outputs of counters 32 and 42 will be logic 1 only if the value in the counter is zero. Counters 31 and 33 have an output which is equal to the present value in the counter. Counters 31 and 33 will have their present value increased by one only if a positive pulse is applied to their increment inputs. The output of flip flop 52 will be a pulse that will cause counter 31 to be set to the value that appears on line 21 so that counter 31 may then count through all the locations on the list. The start location or the area specified within computer 10 wherein the sorted data is going to be stored is transmitted from interface 20 to upcounter 33 via line 23.

Comparator 37 has two inputs: lines 24 and 25. The output of comparator 37 will be a logical 1 only if the value of the number on line 25 is less than the value of the number on line 24.

Comparator 29 has two inputs: lines 25 and 13. The output of comparator 29 will be a logical 1 if the value of the number on line 25 is greater than the value of the number on line 13.

The outputs of comparators 37 and 29 and the count of five pulse from clock 34 are coupled to the inputs of AND gate 39. The purpose of ANDing these compare functions is to detect a number from the unsorted list which is less than any number observed so far but which is also greater than the most recent number in the list of sorted numbers being produced. The "unsorted" numbers are transmitted on line 25. The "lowest number observed thus far" is stored in register 27 and transmitted on line 24. And the "most recent number" is stored in register 45 and transmitted on line 13.

In order to better understand the operation of the apparatus of this invention we are going to assume that a sort is going to be performed on data words that are stored in four locations of the memory of computer 10. For purposes of this example we will assume that no number in the sorted list will have a value greater than two hundred fifty-five. The number 255 will be initially stored in register 27, the manner in which the number 255 is stored in register 27 will be hereinafter described.

The number five will be stored in location number 1 which will be at the bottom of the list. A three will be stored in location number 2 and a two will be stored in location number 3. Location number 4 has a 1 stored in it. In order to process the above list, sorter 19 will begin at the bottom of the list. The sorter will know where to start because counter 31 will have a count of one which means that sorter 19 will be processing the word in location number 1. Interface 20 will serially output via bus 25 the numbers 5, 3, 2 and 1 one at a time if and when they are requested by sorter 19. Each number that is going to be sorted is serially transmitted on bus 25 to the input of register 27 (FIG. 2), one of the inputs of comparator 37 and one of the inputs of comparator 39.

The timing of sorter 19 is controlled by multiphase clock 34 (FIG. 1). Clock 34 has 8 counts. Clock 34 counts from 0 to 7. Clock 34 has no outputs for counts of 2, 3 and 4. Thus, sorter 19 uses the counts of 2, 3 and 4 as a settling time. Before computer 10 commences a sort, multiphase clock 34 will have a count of 0. When computer 10 wants to initiate a sort, computer 10 informs interface 20 via bus 11 to transmit a signal to flip flop 62 via line 14. The input of inverter 51 is grounded and the output of inverter 51 is used to provide a positive signal to the data inputs of flip flops 52 and 62. Inverter 51 will constantly have a positive output. Consequently, flip flops 52 and 62 will be respectively changed to a positive state when the clock inputs respectively arrive from counters 32 and 42. The output of flip flop 62 is coupled to the input of clock 34. When the input to clock 34 is a logic 1 clock 34 will count to zero and stop. When the input to clock 34 is a logic zero, clock 34 will repeatedly count from 0 thru 7. The output of flip flop 52 is coupled to the input of: counters 31 and 32; and to AND gates 55 and 56. The second input to gate 55 is the 0 count produced by multiphase clock 34. When the foregoing signals arrive at the inputs of gate 55, gate 55 will be enabled. The output of gate 55 sets register 27 to the value 255 (FIG. 2) via line 70. Flip flop 62 (FIG. 1) and register 45 (FIG. 2) are reset by a signal that is transmitted from interface 20 via line 14.

The output of flip flop 62 (FIG. 1) causes clock 34 to begin counting. The count of 1 pulse from clock 34 is transmitted to flip flop 52 for purposes of resetting flip flop 52. Clock 34 has no output for counts of 2, 3 and 4. The output of comparator 37 is coupled to the first input of AND gate 39 and the output of comparator 29 is coupled to the second input of AND gate 39. The third input to AND gate 39 is the multiphase clock 34 count of 5 signal that is transmitted to gate 39 via line 71. Comparator 37 will be comparing the number that is stored in the first memory location of computer 10 (the number 5 will be in the first memory location and it will be transmitted to comparator 37 via line 25) with the number 100 which is the number currently being stored in register 27. The number 100 is transmitted to comparator 37 via line 28. The output of comparator 37 will be a positive signal because the number 5 is less than 255. A 0 is currently stored in register 45. The output of register 45 is connected to one of the inputs of comparator 29 via line 13. Thus, a 0 is transferred to comparator 29 via line 13. The other input to comparator 29 is line 25. Comparator 29 will now compare the number 5 and 0. Since 5 is greater than 0, comparator 29 will have a positive output. Gate 39 will be enabled when the positive output signals produced by comparator 37, comparator 29 and the count of 5 pulse of clock 34 are present. The output of gate 39 causes the number currently on line 25 to be stored in register 27. Sorter 19 has just examined one word. The count of 6 pulse produced by clock 34 fires flip flop 52 which causes the decrementing of counter 32 and the incrementing of counter 31. Thus, counter 32 will now have a count of 3. Counter 31 will have a count of 2 which is transmitted to interface 20 to inform computer 10 that sorter 19 wants to process the word that is currently being stored in memory location number 2.

The word in memory location number 2 is 3. The number 3 is transmitted to comparator 37 via bus 25, and the number 5 is transmitted to comparator 37 via line 24. Since the number 3 is less than the number 5, the output of comparator 37 will be a positive signal. A 0 is currently being stored in register 45. The output of register 45 is connected to one of the inputs of comparator 29 via line 13. The second input to comparator 29 is bus 25. This value is compared to the value in register 45. Since 3 is greater than 0 comparator 29 will have a positive output. When the multiphase clock 34 count of 5 signal and the foregoing are present at the three inputs to gate 39, gate 39 will be enabled. The output of gate 39 causes register 27 to store the number 3 which is currently on bus 25. During the multiphase clock 34 count of 6 pulse counter 32 will be decremented from 3 to 2 and counter 31 will be incremented from 2 to 3. Counter 31 then outputs the number 3 to interface 20 to inform computer 10 that sorter 19 wants to process the word that is currently being stored in memory location number 3. The third memory location contains the number 2. Computer 10 transmits the number 2 to interface 20 via bus 12. The number 2 will be transmitted to one of the inputs of comparator 37 via line 25. The number 3 will be transmitted to comparator 37 via line 24. Since 2 is less than 3 comparator 37 will have a positive output. The number 2 will be transmitted to comparator 29 via bus 25 and the number 0 will be transmitted to comparator 29 via line 13. Since 2 is greater than 0 comparator 29 will have a positive output. Gate 39 will be enabled when the foregoing two comparator outputs and the clock 34 count of 5 signal are present at the inputs of gate 39. Gate 39 will have a positive output which will cause the number 2 to be stored in register 27. During the multiphase clock 34 count of 6 pulse, counter 32 will be decremented from 2 to 1 and counter 31 will be incremented from 3 to 4 and counter 31 outputs the number 4 to interface 20 in order to inform computer 10 that sorter 19 wants to process the word that is currently being stored in memory location number 4. A 1 is being stored in memory location number 4, therefore a 1 will be transmitted to comparator 37 via bus 25. The number 2 is currently being stored in a register 27 and the number 2 will be transmitted to comparator 37 via line 24. Since 1 is less than 2 comparator 37 will have a positive output. Comparator 29 will compare the number 1 to the number 0. Comparator 29 will have a positive output because 1 is greater than 0. Gate 39 will be enabled when the multiphase clock 34 count of 5 signal, the output of comparator 37 and the output of comparator 29 are present at the three inputs of AND gate 39. The output of 39 will cause a 1 to be written into register 27. During the clock 34 count of 6 pulse counter 32 will be decremented from 1 to 0. Once counter 32 reaches a count of 0 the output of counter 32 will be positive indicating the counter is empty. The input of inverter 51 is grounded and the output of inverter 51 is used to provide a positive signal to the data inputs of flip flop 52 so that a 1 may be clocked into flip flop 52. Flip flop 52 will have a positive output which will cause AND gates 56 and 55 to be enabled at their appropriate clock enabling time. Gate 56 will be enabled by the count of 7 pulse of clock 34 and gate 55 will be enabled by the 0 count of clock 34. The output of flip flop 52 also causes counter 31 to be reloaded with the value that is currently on line 21 and counter 32 to be loaded with the value that is sitting on line 22. Line 21 connects interface 20 to counter 31 and line 22 connects interface 20 to counter 32, so that computer 10 can supply information to counters 31 and 32. At multiphase clock 34 count of 7 a positive signal appears at one of the two inputs to gate 56, since the second input to gate 56 is the output of flip flop 52 gate 56 will be enabled at this time. The output of gate 56 is connected to the clock input of register 45 via line 72 so that the number currently appearing on line 24 may be written into register 45. A 1 is currently on line 24. The output of gate 56 is also connected to interface 20, counter 33 and counter 42. Interface 20 will now cause the number 1 which is currently on line 24 to be written into computer 10 at the location supplied by the output of counter 33 on line 9. Upcounter 33 will be incremented in order to indicate where the next word will be stored and downcounter 42 will be decremented from 4 to 3 to indicate that there are 3 more words to be sorted. At this time downcounter 42 is not empty, hence it will not output a signal that will fire flip flop 62.

Clock 34 will now count from 7 to 0. When clock 34 reaches the count of 0, AND gate 55 will be enabled because the other input to gate 55 (the output of flip flop 52) is present. The output of gate 55 causes register 27 to be set to its maximum value of 255. Previous to this, however, gate 56 was enabled at count of 7 from multiphase clock 34 which loaded register 45 with the value 1 which was in register 27, at the same time will also tell the computer interface to send the value 1 to the computer as its first sorted value and that will go to the computer on line 28 which becomes bus 24 to the computer interface.

Flop flop 52 will be reset when clock 34 reaches a count of 1. Counter 31 will now have a count of 1 indicating that sorter 19 is now looking at the first location in the unsorted list and downcounter 32 will have a count of 4 indicating that 4 words are going to be searched in this iteration. Upcounter 33 will now have a value which indicates the next location that a word will be stored in computer 10. Downcounter number 42 contains the number 3 which indicates that there are 3 words remaining in the sorted list that must be sorted. Sorter 19 is now ready to search for the second word in the sorted list. Comparator 37 will compare the number that is stored in the first memory location of computer 10 (the number 5 will be in the first memory location) with the number currently being stored in register 27 (the number 255 is currently being stored in register 27). The output of comparator 37 will be a positive signal because the number 5 is less than the number 255. A 1 is currently being stored in register 45. Thus, comparator 29 will compare the number 5 to the number 1. Comparator 29 will have a positive output since the number 5 is greater than the number 1. When the multiphase clock 34 count of 5 signal and the foregoing two comparator outputs are present at the three inputs to AND gate 39, gate 39 will be enabled. The output of gate 39 causes register 27 to store the number 5 which is currently on bus 25. The multiphase clock 34 count of 6 pulse causes counter 32 to be decremented from 4 to 3 and counter 31 to be incremented from 1 to 2. The output of upcounter 31 is coupled to the input of computer interface 20. Computer interface 20 will now put word number 2 on bus 25. Hence, the number 3 will be transmitted to comparators 37 and 29. Comparator 37 will compare the number 3 currently on line 25 with the number 5 previously stored in register 27, since 3 is less than 5 comparator 37 will have a positive output. Comparator 29 will compare the number 3 with the number 1 which is presently being stored in register 45. Since 3 is greater than 1 comparator 29 will have a positive output. AND gate 39 will be enabled when the foregoing 2 comparator outputs and the multiphase clock count of 5 signal arrive. The outgate 39 will have a positive output which will cause the number 3 to be stored in register 27. Multiphase clock count of 6 pulse will increment upcounter 31 from the value 2 to the value 3. Multiphase clock count of 6 pulse will also decrement the downcounter from a count of 3 to the count of 2. At this time counter 31 outputs the number 3 that is transmitted to interface 20 in order to inform computer 10 that sorter 19 wants to process the word that is currently being stored in memory location number 3. The number 2 is currently being stored in memory location number 3 and it will be transmitted to the inputs of comparators 37 and 29 via bus 25. Comparator 37 will compare the number that is stored in register 27, i.e., a 3, with the number 2. Since 2 is less than 3 comparator 37 will have a positive output. Comparator 29 will compare the number 2 to the number 1, (1 is currently being stored in register 45). Since 2 is greater than 1 comparator 29 will have a positive output. The outputs of comparators 37 and 29 and the multiphase clock count of 5 signal cause the enabling of gate 39. The output of gate 39 will cause register 27 to store the number that is currently on bus 25 during multiphase clock count of 5. The number 2 is currently on bus 25. During multiphase clock 34 count of 6 pulse downcounter 32 will be decremented from 2 to 1 and upcounter 31 will be incremented from 3 to 4. At this time counter 31 outputs a signal that is transmitted to interface 20 in order to inform computer 10 that sorter 19 wants to process the word that is currently being stored in memory location number 4. A 1 is currently being stored in memory location number 4, therefore a 1 will be transmitted to comparator 37 via line 25. The number 2 is currently being stored in register 27 and the number 2 will be transmitted to comparator 37 via line 28. Since 1 is less than 2 comparator 37 will have a positive output. Comparator 29 will compare the number on line 25 with the number on line 13. Currently there is a 1 on line 25 and a 1 on line 13. Since 1 is not greater than 1 comparator 29 will have a low output which means that AND gate 39 will not be enabled on this cycle. The number 2 will remain in register 27. The count of 6 pulse from multiphase clock 34 will cause upcounter 31 to be incremented to a count of 5 and downcounter 32 to be decremented to a count of 0. Downcounter 32 is now zero, consequently it will have a positive output. The output of counter 32 is coupled to the input of flip flop 52. The input of inverter 51 is grounded and the output of inverter 51 is used to provide a positive signal to the data inputs of flip flop 52. Thus, at this time a 1 will be clocked into flip flop 52. Flip flop 52 will have a positive output, which will cause AND gates 56 and 55 to be enabled at their appropriate clock enabling time. Gate 56 will be enabled by the count of 7 pulse of clock 34 and gate 55 will be enabled by the 0 count of clock 34. The output of flip flop 52 also causes counter 31 to be reloaded with the value that is currently on line 21 and counter 32 to be loaded with the value that is sitting on line 22. Upcounter 31 will have a count of 1 and downcounter 32 will have a count of 4. At multiphase clock 34 count of 7 pulse a positive signal appears at one of the two inputs to AND gate 56, since the second input to gate 56 is the output of flip flop 52, gate 56 will be enabled at this time. The output of gate 56 is connected to the clock input of register 45 via line 72 so that the number currently appearing on line 2 may be written into register 45. The number 2 is currently on line 28, therefore a 2 will be written into register 45. The output of gate 56 is also connected to interface 20, counter 33, and counter 42. Interface 20 will now cause the number 2 which is currently on line 24, 28 to be written into computer 10 at the location given by the output of counter 33. Upcounter 33 will be incremented in order to indicate where the next word will be stored and downcounter 42 will be decremented from 3 to 2 to indicate that there are two more words to be sorted. At this time downcounter 42 is not empty, hence it will not output a signal that will enable flip flop 62.

Clock 34 will now count from 7 to 0. When clock 34 reaches the count of 0 AND gate 55 will be enabled because the other input to gate 55 (the output of flip flop 52) is present. The output of gate 55 causes register 27 to be set to its maximum value of 255. The count of 1 pulse from clock 34 resets flip flop 52. Sorter 19 is ready to process the third word of the sorted list. Comparator 37 will compare the number that is stored in the first memory location of computer 10 (the number 5 will be in the first memory location) with the number currently being stored in register 27 (the number 255 is currently being stored in register 27 and is transmitted to comparator 37 via line 2). The output of comparator 37 will be a positive signal because the number 5 is less than the number 255. The output of register 45 is connected to one of the inputs of comparator 29 via line 13. Thus, a 2 is transferred to comparator 29 via line 13. Since 5 is greater than 2 comparator 29 will have a positive output. When the positive output signals produced by comparator 37, comparator 29 and the count of 5 pulse of clock 34 are present at the inputs of gate 39, gate 39 will be enabled.

The output of gate 39 will cause register 27 to store the number 5 which is presently on bus 25. The count of 6 pulse produced by clock 34 causes the decrementing of counter 32 and the incrementing of counter 31. Thus, counter 32 will now have a count of 3 and counter 31 will have a count of 2. Counter 31 then outputs a signal to interface 20 to inform computer 10 that sorter 19 wants to process the word that is currently being stored in memory location number 2. The word in memory location number 2 is 3. The number 3 is transmitted to comparator 37 via bus 25 and the number 5 is transmitted to comparator 37 via line 2. Since the number 3 is less than the number 5, the output of comparator 37 will be positive. Comparator 29 will compare the value 3 to the value that is currently being stored in register 45. Since 3 is greater than 2 comparator 29 will have a positive output. When the multiphase clock 34 count of 5 signal and the foregoing two comparator outputs are present at the three inputs to gate 39, gate 39 will be enabled. The output of gate 39 causes register 27 to store the number 3 which is currently on bus 25. During the multiphase clock 34 count of 6 pulse, counter 32 will be decremented from 3 to 2 and counter 31 will be incremented from 2 to 3. Counter 31 then outputs the number 3 to interface 20 to inform computer 10 that sorter 19 wants to process the word that is currently being stored in memory location number 3. The third memory location contains the number 2. Computer 10 transmits the number 2 to interface 20 via bus 12. The number 2 will be transmitted to one of the inputs of comparator 37 via bus 25. The number 3 will be transmitted to comparator 37 via line 28. Since 2 is less than 3 comparator 37 will have a positive output. The number 2 will be transmitted to comparator 29 via bus 25 and the number 2 will be transmitted to comparator 29 via line 13. Since 2 is not greater than 2 comparator 29 will have a low output. This means that AND gate 39 will not be enabled when the multiphase clock count of 5 pulse arrives. Register 27 will still contain the number 3. During the multiphase clock 34 count of 6 pulse, counter 32 will be decremented from 2 to 1 and counter 31 will be incremented from 3 to 4. At this time counter 31 outputs the number 4 that is transmitted to interface 20 in order to inform computer 10 that sorter 19 wants to process the word that is currently being stored in memory location number 4. A 1 is currently being stored in memory location number 4, therefore a 1 will be transmitted to comparator 37 via bus 25. The number 3 is currently being stored in register 27 and the number 3 will be transmitted to comparator 37 via line 28. Since 1 is less than 3 comparator 37 will have a positive output. Comparator 29 will compare the number 1 to the number 2. Since 1 is not greater than 2 comparator 29 will have a low output. Thus, AND gate 39 will not be enabled when the count of 5 signal arrives from clock 34 and register 27 will still store the number 3. During the clock 34 count of 6 pulse, counter 32 will be decremented from 1 to 0. Once counter 32 reaches a count of 0 the output of counter 32 will be positive indicating that the counter is empty. The input of inverter 51 is grounded and the output of inverter 51 is used to provide a positive signal to the data inputs of flip flop 52 so that a 1 may be clocked into flip flop 52. Flip flop 52 will have a positive output which will cause AND gates 56 and 55 to be enabled at their appropriate clock enabling time. Gate 56 will be enabled by the count of 7 pulse of clock 34 and gate 55 will be enabled by the 0 count of clock 34. The output of flip flop 52 also causes counter 31 to be reloaded with the value 1 and downcounter 32 to be reloaded with the value 4. At multiphase clock 34 count of 7 pulse a positive signal appears at one of the 2 inputs to gate 56, since the second input to gate 56 is the output of flip flop 52, gate 56 will be enabled at this time. The output of gate 56 is connected to the clock input of register 45 via line 72 so that the number currently appearing on line 24 may be written into register 45. A three is currently on line 24. The output of gate 56 is also connected to interface 20, counter 33 and counter 42. Interface 20 will now cause the number 3 which is currently on line 24, 28 to be written into computer 10 at the location specified by the output of counter 33. Upcounter 33 will be incremented in order to indicate where the next word will be stored and downcounter 42 will be decremented from 2 to 1 to indicate that there is one more word left to be sorted. At this time downcounter 42 is not empty, hence it will not output a signal that will fire flip flop 62.

Clock 34 will now count from 7 to 0. When clock 34 reaches the count of 0 AND gate 55 will be enabled because the other input to gate 55 (the output of flip flop 52) is present. The output of gate 55 causes register 27 to be sent to its maximum value of 255. Upcounter 31 informs interface 20 to process the word that is currently being stored in location number 1. The number in location 1 is a 5. Therefore a 5 will be transmitted to comparators 37 and 29 via bus 25. The number 255 is transmitted to comparator 37 via line 2. The output of comparator 37 will be a positive signal because the number 5 is less than 255. A 3 is currently being stored in register 45. The output of register 45 is connected to one of the inputs of comparator 29 via line 13. Thus, a 3 is transferred to comparator 29 via line 13.

Since 5 is greater than 3 the output of comparator 29 will be positive. The positive outputs of the foregoing comparators are coupled to the inputs of AND gate 39. AND gate 39 will be enabled when the multiphase clock 34 count of 5 signal arrives. The output of gate 39 will cause register 27 to be loaded with the number 5 which is the number currently on line 25. The multiphase clock 34 count of 6 signal will increment counter 31 from 1 to 2. The number 2 is transmitted to computer 10 via line 9 and interface 20 so that computer 20 will be instructed to supply the number in location two, i.e., a 3 to sorter 19. Counter 32 is decremented from 4 to 3 since counter 32 is not at a count of zero the output of counter 32 will be negative. The number 3 supplied by the computer is transmitted to comparators 37 and 29 via line 25. The second input of comparator 37 is line 24. The number 5 is currently on line 24. Since the number 3 is less than the number 5 the output of comparator 37 is positive. The second input of comparator 29 is line 13. The number 3 is on line 13. Since the number 3 is not greater than the number 3 the output of comparator 29 is negative. This negative output will cause AND gate 39 to be disabled and register 27 will continue to store the number 5. Upcounter 31 will now be incremented from 2 to 3 and downcounter 32 will be decremented from 3 to 2. The number in computer location number 3 is a 2 and this number will be transmitted to comparators 37 and 29 via line 25. The second input to comparator 37 is line 24. The number 5 is currently on line 24. Since the number 2 is less than the number 5, the output of comparator 37 will be a positive signal. The second input to comparator 29 is line 13. The number 3 is currently on line 13. Since 2 is not greater than 3, comparator 29 will have a low output which will inhibit gate 39 at the multiphase clock count of 5 signal. Register 27 will still contain the number 5. During the multiphase clock 34 count of 6 pulse counter 31 will be incremented from 3 to 4 and counter 32 will be decremented from 2 to 1. The output from counter 31 which is a 4 will instruct interface 20 to supply sorter 19 with the value that is stored in location number 4. A 1 is currently being stored in location number 4, therefore a 1 will be transmitted through the computer interface over bus 25 to comparators 37 and 29. Comparator 37 will compare the number 5 which is presently stored in register 27 to the number 1 which is currently on bus 25. Since 1 is less than 5 comparator 37 will have a positive output. Comparator 29 will compare the value 1 which is on bus 25 with the number 3 which is currently stored in register 45. Since 1 is not greater than 3 comparator 29 will have a low output. Thus gate 39 will not be enabled by the multiphase clock 34 count of 6 pulse, counter 31 will be incremented from 3 to 4 and counter 32 will be decremented from 1 to 0. Once counter 32 reaches a count of 0 the output of counter 32 will be positive indicating that the counter is empty. The input of inverter 51 is grounded and the output of inverter 51 is used to provide a positive signal to the data inputs of flip flop 52, so that a 1 may be clocked into flip flop 52. Flip flop 52 will have a positive output which will cause AND gates 56 and 55 to be enabled at their appropriate clock enabling time. At multiphase clock 34 count of 7 pulse, a positive signal appears at one of the two inputs to AND gate 56. Since the second input to gate 56 is the output of flip flop 52, gate 56 will be enabled at this time. The output from gate 56 will instruct computer 10 through interface 20 to accept the value 5 which is currently being stored in register 27 and is on line 28. The number 5 will be loaded into the computer at location 1003. Upcounter 33 will be incremented from 1003 to 1004 and downcounter 42 will be decremented from 1 to 0. Once counter 42 reaches a count of 0 it will have a positive output which will cause flip flop 62 to be set with the value provided to it by inverter 51. Thus flip flop 62 will be set to the value of 1. The output of flip flop 62 is coupled to the reset input of multiphase clock 34 causing multiphase clock 34 to stop counting. This will terminate the entire sort and the sort will be complete.

The above specification has described a new and improved system for sorting numbers. It is realized that the above description may indicate to those skilled in the art additional ways in which the principles of this invention may be used without departing from its spirit. It is, therefore, intended that this invention be limited only by the scope of the appended claims.

We claim as our invention:

1. An electronic sorting system that saves computer software and computer time by sorting random data words that are being stored in selectable locations within a digital computer, said system comprising:
   a. an interface that causes the instruction words and data words of a digital computer to be electrically compatible with the remainder of said system so that the instruction and data words may be transferred from said computer;
   b. a first counter an input of which is coupled to said interface so that said first counter may receive instruction words from said interface which indicate the start location of the random data that is being stored within a digital computer;
   c. a second counter an input of which is coupled to said interface so that said second counter may receive instruction words from said interface which indicate the first location within the digital computer in which the sorted data is going to be stored;
   d. a third counter an input of which is coupled to said interface so that said third counter may receive instruction words from said interface which indicate the number of data words that said system has sorted and loaded into the computer;
   e. a fourth counter an input of which is coupled to said interface so that said fourth counter may receive instruction words from said interface which indicate the number of random data words that said sorting system has looked at in order to find the next word in the stored list;
   f. cyclic timing means coupled to said first counter, said second counter, said third counter and said fourth counter for maintaining said system in synchronization;
   g. a first means for storing data words, the output of said first means is coupled to the input of said interface and the input of said first means is coupled to the output of said interface and the output of said timing means;

h. a second means for storing data words, the input of said second means is coupled to the output of said interface, the output of said timing means and the output of said first means;

i. a first means for comparing data words, said first comparing means having two inputs that receive data words the first input being coupled to the output of said interface and the second input being coupled to the output of said first storing means so that said first comparing means may compare the data words appearing at its two inputs and determine the data word that has the greatest value;

j. a second means for comparing data words, said second comparing means having two inputs that receive data words, the first input being coupled to the output of said interface and the second input being coupled to the output of said second storing means so that said second comparing means may compare the data words appearing at its two inputs and determine the data word that has the greatest value; and, k. means for determining that said first comparing means and said second comparing means have determined the data words that have the highest value, the inputs of said determining means are coupled to the output of said first comparing means, said second comparing means and said timing means and the output of said determining means is coupled to the input of said first storing means, whereby at the beginning of the sort said first storing means is set to its highest value and said second sorting means is set to zero whereupon each data word in the unsorted list is compared by said first and second comparing means in order to find data words that have a greater value than what is stored in said second storing means and a lesser value than what is stored in said first storing means, thence respectively stored in said first storing means until all the data words in the sorted list are compared, thence the data word currently stored in said first storing means is loaded into the computer, and said first storing means is set to its maximum value and said second storing means is set to the last value entered into the sorted list so that at the end of the sort a sequence of data words will be found and listed in the computer in ascending order.

2. The system claimed in claim 1 wherein said first storing means is a first register.

3. The system claimed in claim 1 wherein said second storing means is a second register.

4. The system claimed in claim 1 wherein said first comparing means is a first comparator.

5. The system claimed in claim 1 wherein said second comparing means is a second comparator.

6. The system claimed in claim 1 wherein said determining means is a first coincidence gate.

7. The system claimed in claim 1 wherein said cyclic timing means comprises:

a. a clock oscillator;

b. an inverter the input of which is coupled to ground;

c. a first flip flop whose inputs are coupled to the output of said clock oscillator, the output of said third counter, the output of said interface, and the output of said inverter, so that said first flip flop will produce an output signal which will be received by said third counter and said first counter at the proper time;

d. a second flip flop whose inputs are coupled to the output of said inverter, the output of said interface and the output of said fourth counter so that said second flip flop will produce an output signal which will be received by said clock at the proper time;

e. a second coincidence gate whose inputs are coupled to the output of said clock and the output of said first flip flop so that the output of said second coincidence gate will be at the input of said interface and the input of said second means for storing data; and, f. a third coincidence gate whose inputs are coupled to the output of said clock and the output of said first flip flop so that the output of said third coincidence gate will be at the input of said first means for storing data.

* * * * *